Sept. 28, 1954  J. D. BRODER  2,690,465
SOLID ION ELECTROLYTE BATTERY
Filed June 4, 1953
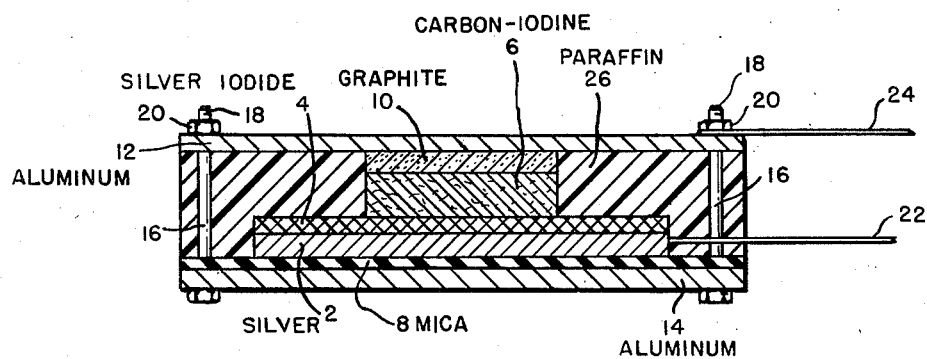
*INVENTOR.*
JACOB D. BRODER
BY *Harry M. Saragovitz*
*ATTORNEY*

UNITED STATES PATENT OFFICE 2,690,465

SOLID ION ELECTROLYTE BATTERY

Jacob D. Broder, Long Branch, N. J.

Application June 4, 1953, Serial No. 359,672

4 Claims. (Cl. 136—153)

(Granted under Title 35, U. S. Code (1952), sec. 266)

The invention described herein may be manufactured and used by or for the Government for governmental purposes, without the payment of any royalty thereon.

The present invention relates to batteries and more particularly to primary cells consisting entirely of solid components and is an improvement on the copending application of Kurt Lehovec entitled "Solid Ion Electrolyte Battery," S. N. 362,976 filed June 19, 1953, which claims the broad subject matter.

In the conventional dry battery such as the Leclanché cell, electronic conduction occurs only in the external circuit. In the oxidation-reduction reaction in the Leclanché cell, the zinc metal exhibits a tendency to go into solution in the aqueous electrolyte providing zinc ions and electrons and the manganese dioxide is reduced. In order for the reaction to take place and to provide an electric current, the electrons must be forced to go from the anode to the cathode through an external circuit. This is made possible by the presence of the aqueous solution which according to Faraday's law is a near perfect electronic insulator. Therefore, in the normal reaction, the ions diffuse from the zinc electrode into the electrolyte and the electrons move to the manganese dioxide by an external circuit.

The necessity for the presence of the aqueous solution in such a cell leads to several disadvantages. One disadvantage is the limitation of any possibility of miniaturization due to the necessary volume required to contain the electrolyte. Another disadvantage is the poor shelf life of the battery, probably due to the drying and crystallization of the constituents of the electrolyte resulting in some electronic conduction therein and a decrease in space for the diffusion of the zinc ions from the anode.

Accordingly, it is a primary object of the present invention to provide a primary cell of improved shelf life and capable of extreme miniaturization.

A further object is to provide a primary cell which does not require an aqueous electrolyte.

In accordance with the present invention, there is provided a primary cell which includes a negative electrode comprising silver, a positive electrode comprising iodine and a solid ion electrolyte between and in contact with said electrodes.

It has been found that certain substances are near perfect electronic insulators. The halides of silver are examples of such compounds, all being good ionic conductors and showing little or no electronic conductivity. In addition, these compounds permit the diffusion of a metal ion such as silver ions therethrough making possible a silver electrode which provides silver ions and electrons. Silver ions readily diffuse through the crystal lattice of a silver halide.

A preferred embodiment of the present invention is a solid ion electrolyte battery comprising the system $Ag/AgI/I_2$. The silver is the negative electrode providing silver ions and electrons, and iodine is the positive electrode to which the electrons flow in the external circuit. In the chemical reaction, iodine is reduced in accordance with the following reactions:

$$2Ag \rightarrow 2Ag^+ + 2e \qquad (1)$$
$$I_2 + 2e \rightarrow 2I^- \qquad (2)$$

The addition of reactions 1 and 2 may be expressed as:

$$2Ag + I_2 \rightarrow 2AgI \qquad (3)$$

When the positive and negative electrodes are connected in an external circuit, the silver ions are able to leave the silver electrode by diffusing through the interstices of the crystal lattice of the silver iodide and the electrons due to the electronic insulating properties of the silver iodide, must proceed to the iodine through the external circuit. It is to be noted, therefore, that in addition to permitting the elimination of the aqueous electrolyte in the present embodiment, the reaction between silver and iodine is constantly forming new silver iodide electrolyte.

Referring to the drawing, there is shown an embodiment in accordance with the present invention. A sheet of silver 2 has on one surface a silver iodide layer 4. In contact with the layer 4 is a pellet 6 comprising an intimate mixture of iodine and carbon. In contact with the other surface of silver sheet 2 is a sheet of mica 8 and on pellet 6 is a graphite disc 10. The graphite carbon-iodine, silver iodide, silver, mica arrangement is sandwiched between aluminum plates 12 and 14 as shown and the entire assembly is held together by compression posts such as at 16 which are threaded at their ends 18 to receive nuts 20 which serve to tighten the assembly, thereby insuring close contact between all the elements of the system. A lead wire 22 from the negative electrode, silver 2 and a lead wire 24 from the positive electrode, iodine-carbon are provided for electrical connection in an external circuit. It is to be understood that lead wire 24 from the positive electrode, carbon-iodine 6 may be attached directly to the aluminum plate 12. Since aluminum is a good conductor and the electric circuit is readily completed therethrough from the silver to the iodine. Graphite disc 10 is provided between aluminum plate 12 and pellet 6 to prevent any corrosion of aluminum plate 12 by iodine and mica sheet 8 is provided between aluminum plate 14 and silver sheet 2 to prevent a short therebetween. Other suitable materials well known in the art may be used in place of the graphite and mica respectively.

In constructing the present embodiment, the silver sheet is first prepared by cleaning it in a suitable manner. The silver iodide layer is formed by heating a weighed amount of iodine with the cleaned silver sheet under vacuum conditions. In this manner, the thickness of the silver iodide layer is readily controlled and a layer of less than 1 mil thickness is readily achieved.

The carbon-iodine electrode may be prepared by any convenient method. It has been found that a preferred way is to mix intimately carbon and iodine in the ratio of about 80% carbon to about 20% iodine and press the mixture into pellet form. A portion of the silver-iodide layer is removed and a lead wire is soldered to the exposed silver sheet, the carbon-iodide pellet is placed on the silver-iodide coating and the system is sandwiched between two aluminum plates with a mica sheet inserted between the uncoated silver surface and one aluminum plate and a graphite disc between the carbon-iodine pellet and the other aluminum plate. As described supra, compression posts are provided between the aluminum plates to keep the elements in intimate contact with each other.

In order to protect the exposed silver from being iodized by the iodine and to prevent the iodine from subliming, the whole unit is immersed in paraffin 20 which is permitted to harden, thereby enveloping all of the exposed elements between the aluminum plates in the paraffin. Since the external circuit is completed from the silver through the aluminum and graphite to carbon-iodine positive electrode, the lead wire from the latter may be conveniently soldered or welded directly to aluminum plate or firmly affixed thereto by nut 20 as shown.

As examples of dimensions of the elements of an embodiment of the present invention, the silver sheet is 2.25 square cms. in area, the carbon-iodine pellets and the graphite disc are about ½ in. in diameter, the aluminum plates and the mica sheet are 1½ inches square and the silver iodide layer is approximately 1 mil thick. The electrical values obtained are: open circuit voltage about 0.67 volt and short circuit current about 3 milliamperes. The battery is operative at normal room temperatures and does not require the application of heat to initiate and continue the reaction between silver and iodine.

It can readily be seen from the dimensions of the components set forth that by using a solid ion electrolyte, appreciable voltage and current may be obtained from a solid ion electrolyte battery making it extremely useful where the size of the battery is an important factor. In addition, since the electrolyte is a solid, the battery is not subject to the same deleterious effects as a conventional dry cell having an aqueous electrolyte, thereby greatly improving its shelf life.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed:

1. A primary cell including a negative electrode comprising silver, a positive electrode comprising an intimate mixture of carbon and iodine, and a solid ion electrolyte between and in contact with said electrodes.

2. A primary cell including a negative electrode comprising silver, a positive electrode comprising an intimate mixture of carbon and iodine, and a solid ion electrolyte between and in contact with said electrodes comprising a silver halide.

3. A primary cell including a negative electrode comprising silver, a positive electrode comprising an intimate mixture of carbon and iodine, and a solid ion electrolyte between and in contact with said electrodes comprising silver iodide.

4. A primary cell including a negative electrode comprising silver, a positive electrode comprising an intimate mixture consisting of about 20% iodine and about 80% carbon and a solid ion electrolyte between and in contact with said electrodes comprising silver iodide.

References Cited in the file of this patent

UNITED STATES PATENTS

| Number | Name | Date |
|---|---|---|
| 1,834,250 | Martus | Dec. 1, 1931 |
| 2,050,174 | Gordon | Aug. 4, 1936 |